United States Patent
Foo

(10) Patent No.: US 10,585,700 B2
(45) Date of Patent: *Mar. 10, 2020

(54) MULTI-PHASED AND MULTI-THREADED PROGRAM EXECUTION BASED ON SIMD RATIO

(71) Applicant: Imagination Technologies Limited, Kings Langley (GB)

(72) Inventor: Yoong Chert Foo, London (GB)

(73) Assignee: Imagination Technologies Limited, Kings Langley (GB)

( * ) Notice: Subject to any disclaimer, the term of this patent is extended or adjusted under 35 U.S.C. 154(b) by 269 days.

This patent is subject to a terminal disclaimer.

(21) Appl. No.: 15/056,866

(22) Filed: Feb. 29, 2016

(65) Prior Publication Data

US 2016/0179519 A1    Jun. 23, 2016

Related U.S. Application Data

(63) Continuation of application No. 13/068,791, filed on May 19, 2011, now Pat. No. 9,304,812.

(30) Foreign Application Priority Data

Dec. 16, 2010 (GB) .................................. 1021414.6

(51) Int. Cl.
*G06F 9/46* (2006.01)
*G06F 15/80* (2006.01)
(Continued)

(52) U.S. Cl.
CPC .......... *G06F 9/4881* (2013.01); *G06F 9/3005* (2013.01); *G06F 9/3009* (2013.01);
(Continued)

(58) Field of Classification Search
CPC ........ G06F 9/3887; G06F 9/46; G06F 9/4881; G06F 9/522; G06F 15/8007; G06F 9/3851; G06T 1/20
See application file for complete search history.

(56) References Cited

U.S. PATENT DOCUMENTS

| 5,968,167 A | 10/1999 | Whittaker et al. |
| 6,105,127 A | 8/2000 | Kimura et al. |

(Continued)

FOREIGN PATENT DOCUMENTS

| DE | 102008020782 A1 | 11/2009 |
| WO | 2006-083291 A3 | 8/2006 |
| WO | 2010001736 A | 1/2010 |

OTHER PUBLICATIONS

Sugerman, "GRAMPS: A Programming Model for Graphics Pipelines", ACM Transactions on Graphics, vol. 28, No. 1, Article 4, Publication date: Jan. 2009, pp. 1-11.

(Continued)

*Primary Examiner* — David J. Huisman
(74) *Attorney, Agent, or Firm* — Potomac Law Group, PLLC; Vincent M DeLuca

(57) ABSTRACT

A microprocessor is configured to execute programs divided into discrete phases. A scheduler is provided for scheduling instructions. A plurality of resources are for executing instructions issued by the scheduler, wherein the scheduler is configured to schedule each phase of the program only after receiving an indication that execution of the preceding phase of the program has been completed. By splitting programs into multiple phases and providing a scheduler that is able to determine whether execution of a phase has been completed, each phase can be separately scheduled and the results of preceding phases can be used to inform the scheduling of subsequent phases. In one example, different (Continued)

numbers of threads and/or different numbers of data instances per thread may be processed for different phases of the same program.

15 Claims, 5 Drawing Sheets

(51) Int. Cl.
| | |
|---|---|
| *G06F 9/48* | (2006.01) |
| *G06F 9/52* | (2006.01) |
| *G06F 9/30* | (2018.01) |
| *G06F 9/38* | (2018.01) |
| *G06T 1/20* | (2006.01) |
| *G06F 15/78* | (2006.01) |

(52) U.S. Cl.
CPC .......... *G06F 9/3851* (2013.01); *G06F 9/3887* (2013.01); *G06F 9/46* (2013.01); *G06F 9/522* (2013.01); *G06F 15/78* (2013.01); *G06F 15/8007* (2013.01); *G06T 1/20* (2013.01)

(56) References Cited

U.S. PATENT DOCUMENTS

| | | | |
|---|---|---|---|
| 6,128,712 A * | 10/2000 | Hunt | G11B 27/105 348/E7.061 |
| 6,151,668 A | 11/2000 | Pechanek et al. | |
| 6,732,253 B1 | 5/2004 | Redford | |
| 6,897,871 B1 | 5/2005 | Morein et al. | |
| 7,010,787 B2 | 3/2006 | Sakai | |
| 7,058,945 B2 | 6/2006 | Ichinose et al. | |
| 7,327,369 B2 | 2/2008 | Morein et al. | |
| 7,366,878 B1 | 4/2008 | Mills et al. | |
| 7,518,993 B1 | 4/2009 | Dennis | |
| 7,542,043 B1 | 6/2009 | Lindholm et al. | |
| 7,742,053 B2 | 6/2010 | Lefebvre et al. | |
| 7,836,116 B1 | 11/2010 | Goodnight et al. | |
| 7,999,808 B1 | 8/2011 | Aila et al. | |
| 8,018,457 B2 | 9/2011 | Peterson et al. | |
| 8,065,288 B1 | 11/2011 | Garland et al. | |
| 8,174,531 B1 | 5/2012 | Lindholm et al. | |
| 8,405,665 B2 | 3/2013 | Lindholm et al. | |
| 8,499,305 B2 | 7/2013 | Jiao | |
| 8,615,762 B2 | 12/2013 | Nishihata | |
| 9,304,812 B2 * | 4/2016 | Foo | G06F 9/3009 |
| 2004/0107421 A1 | 6/2004 | VoBa et al. | |
| 2005/0097552 A1 | 5/2005 | O'Connor et al. | |
| 2008/0072015 A1 | 3/2008 | Julier et al. | |
| 2008/0098208 A1 | 4/2008 | Reid et al. | |
| 2008/0313435 A1 | 12/2008 | Orion et al. | |
| 2009/0089542 A1 | 4/2009 | Laine et al. | |
| 2009/0284523 A1 | 11/2009 | Peterson et al. | |
| 2009/0322752 A1 | 12/2009 | Peterson et al. | |
| 2010/0064291 A1 | 3/2010 | Aila et al. | |
| 2010/0077010 A1 | 3/2010 | Aila et al. | |

OTHER PUBLICATIONS

Lindholm, E. et al. "NVIDIA Tesla: A Unified Graphics and Computing Architecture", IEEE Micro, IEEE Service Center ISSN 0272-1732 (2008), vol. 27, No. 2, p. 39-55.

Aamodt, T.M. "Architecting Graphics Processors for Non-Graphics Compute Acceleration," Communications, Computers and Signal Processing, IEEE ISBN 978-1-4244-4561(2009) p. 963-968.

* cited by examiner

MULTI-PHASED AND MULTI-THREADED PROGRAM EXECUTION BASED ON SIMD RATIO

CROSS-REFERENCE TO RELATED APPLICATION

This application is a continuation under 35 U.S.C. 120 of copending application Ser. No. 13/068,791 filed May 19, 2011.

FIELD OF THE INVENTION

The present invention relates to the field of microprocessors and is particularly advantageous for single instruction multiple data (SIMD) processors.

BACKGROUND TO THE INVENTION

With some types of data, such as graphics data, large blocks of data often need to undergo the same processing operations. One example is when changing the brightness of an image. SIMD processing is advantageous for this process. A SIMD processor is a microprocessor with execution units, caches and memories as with any other processor, but additionally incorporates the concept of parallel execution of multiple data streams. Instead of individually fetching data instances, a single fetch instruction can be used to fetch a block of data. A single instruction can then be used to operate on the fetched data block, such as an "add" operation. SIMD processing therefore reduces the load on the processor as compared with traditional single instruction single data (SISD) processing.

However, SIMD processing can only be used in limited circumstances. For example, even in situations where large blocks of data are initially to be processed in the same way, programs often contain conditional instructions or branch instructions that result in some data in a block being operated on by one branch of instructions and the remaining data by another branch of instructions. It is very often not possible to predict in advance how many data instances will need to be processed by one branch and how many by another.

Typically in a SIMD processor, a scheduler is used to schedule the execution of a program, allocating the resources required by the program at the outset. One solution for programs in which different parts of a data set are processed by different instruction during a portion of the program has been to execute each branch on all of the data and then discard the unwanted results. Clearly this is an inefficient use of processor resources and time.

Accordingly, it would be desirable to be able to better allocate resources during the execution of programs in a SIMD processor, both to reduce power consumption and to optimise resource usage.

SUMMARY OF THE INVENTION

In a first aspect, the invention provides a microprocessor configured to execute programs divided into discrete phases, comprising:
 a scheduler for scheduling program instructions to be executed on the processor; and
 a plurality of resources for executing programming instructions issued by the scheduler;
 wherein the scheduler is configured to schedule each phase of the program only after receiving an indication that execution of the preceding phase of the program has been completed.

Preferably, the processor is a multithreaded processor. Preferably, the processor is a SIMD processor. Preferably, the scheduler is configured to recalculate a SIMD ratio for each phase of the program. The SIMD ratio is the number of data instances processed by a single instruction.

The processor includes a feedback loop to the scheduler through which the completion of each phase of the program is communicated to the scheduler. Preferably the scheduler maintains a record for each phase of the program that is scheduled, during execution of that phase of the program.

Preferably, the processor further includes a thread finished counter, wherein when each thread finishes a phase of the program an indication is sent to the thread finished counter, and the processor is configured such that the scheduler schedules a next phase of the program only when the thread finished counter indicates that all threads for a preceding phase of the program have finished. The thread finished counter may be part of the scheduler or provided as a separate component. The thread finished counter may comprise a memory storing a number of threads for each phase of a program and the thread finished counter decremented each time a thread finishes a phase, and configured such that when the thread finished counter reaches zero, the scheduler is instructed to schedule the next phase of the program.

The thread finished counter may store a record of a number of data instances for each thread of a phase of a program.

Preferably, the scheduler is configured to dynamically allocate the number of threads for each phase of the program based on the results of a preceding phase.

In a second aspect, the invention provides a method for scheduling programs in a microprocessor, the microprocessor comprising a scheduler for scheduling programs of programming instructions, the programs being divided into discrete phases, the method comprising the steps of:
 scheduling a first phase of a program to be executed on the processor; executing
 the first phase of the program scheduled by the scheduler;
 when execution of the first phase of the program is complete, providing an indication to the scheduler that execution of the first phase of the program is complete;
 scheduling a second phase of the program after the scheduler has received the indication that execution of the first phase of the program is complete.

Preferably, the method further comprises maintaining a record for each phase of the program that is scheduled, during execution of that phase of the program.

Preferably, the method further comprises updating the record when each thread finishes a phase of the program, and scheduling a next phase of the program only when the record indicates that all threads for a preceding phase of the program have finished.

Preferably, the method further comprises storing a record of a number of data instances for each thread of a phase of a program.

Preferably, the method further comprises dynamically allocating the number of threads for each phase of the program based on the results of a preceding phase.

In a third aspect, the invention provides a computer program product, comprising computer executable code in the form a program executable on a SIMD processor, wherein the program is divided into a plurality of phases by phase instructions, the phase instructions being provided at points in the program where branches may occur and allowing a scheduler to schedule each phase of the program separately. At these points the SIMD ratio may need to change. An example of a point at which the SIMD ratio may need to change is following a branch instruction or conditional instruction. Another example is a sub-routine for alpha blending or anti-aliasing in a graphics processing program.

BRIEF DESCRIPTION OF THE DRAWINGS

Embodiments of the invention will now be described in detail, by way of example only, with reference to the accompanying drawings, in which.

DETAILED DESCRIPTION

Figure 1:
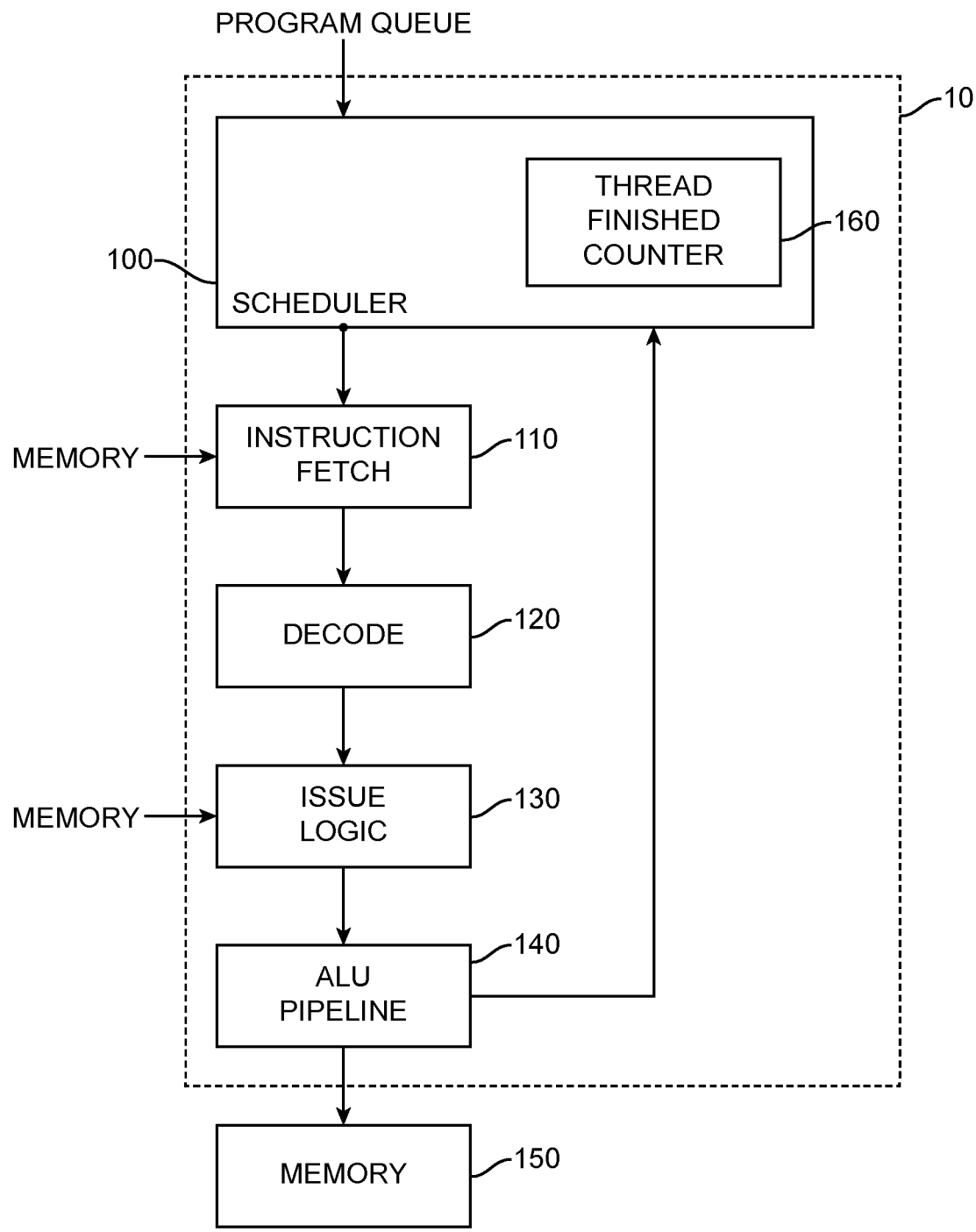
FIG. 1 is a schematic illustration of a processor in accordance with the present invention.
Figure 5:
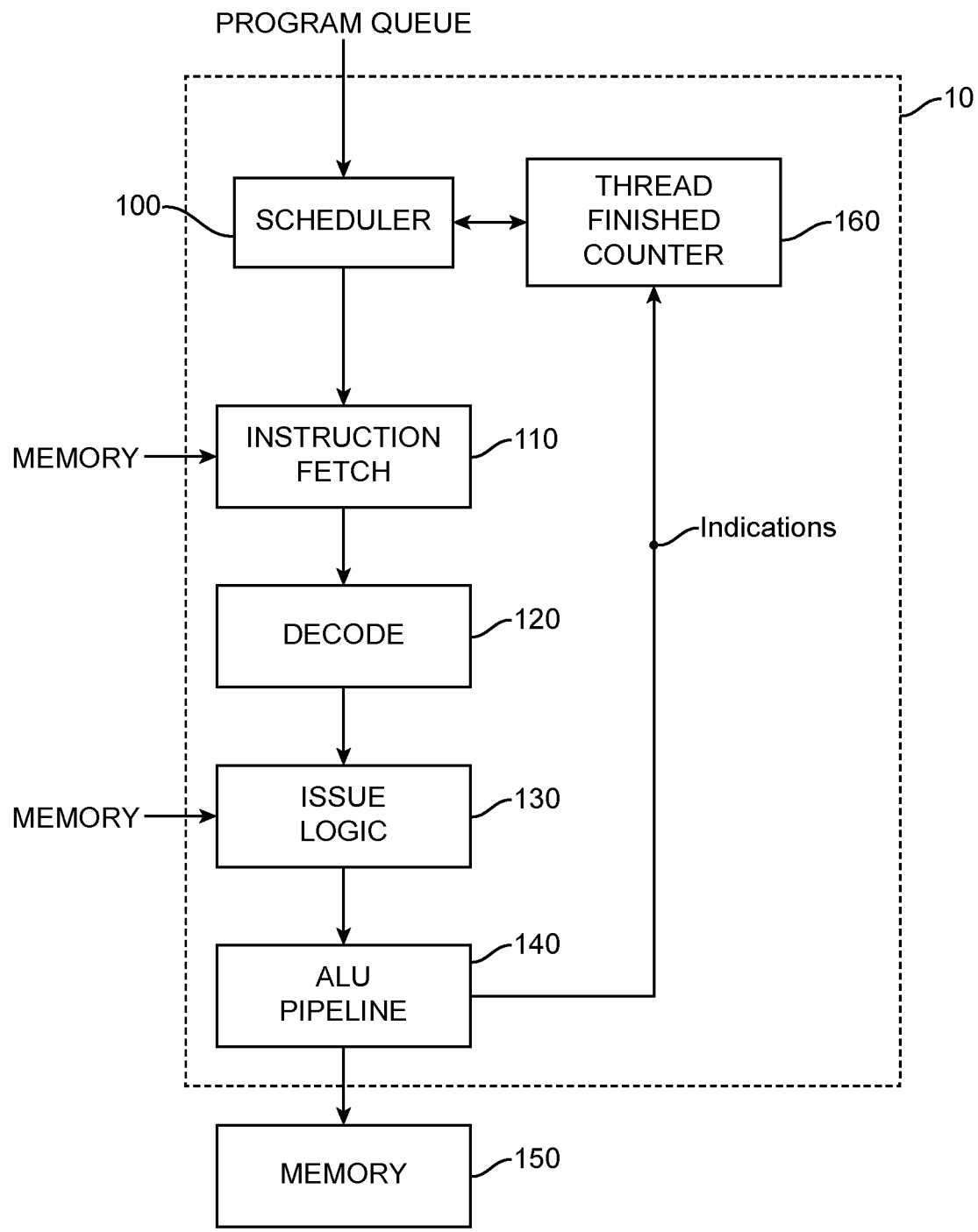
FIG. 5 is a schematic illustration of a processor in accordance with the present invention.

FIG. 1 is a schematic illustration of a multi-threaded SIMD processor 10 in accordance with an embodiment of the present invention. FIG. 5 is a schematic illustration of a multi-threaded SIMD processor 10 in accordance with another embodiment of the present invention; where the disclosures identify FIG. 1, such disclosures apply equally to FIG. 5, except that a thread finished counter is either in the scheduler 100 (FIG. 1) or provided as a separate component (FIG. 5). The processor is configured to schedule and execute individual phases of each program separate from one another, rather than scheduling a complete program all at once and then executing it.

As with conventional processors, following scheduling by the scheduler 100, instructions are fetched from memory by the instruction fetch units 110. Fetched instructions are decoded by the instruction decode unit 120 and fed to the issue logic 130. The issue logic feeds the instructions and fetched data to the arithmetic logic units (ALUs) 140 and the results are stored in registers or memory 150.

The ALUs 140 are also configured to feed back thread finished instructions to the scheduler 100. As will be explained, thread finished instructions are provided at the end of each phase of a program.

New programs are provided to the scheduler 100 divided into multiple phases. The way in which the programs are divided is determined by the programmer but typically a new phase will begin at a point in the program when the resource requirements of the program may change.

For example, a program may include a conditional instruction such that if a data value is less than a threshold it is processed by one branch of instructions otherwise it is processed by another branch of instructions. It may not be possible to determine, before execution, whether all data instances being processed by the program will be processed by a single branch or whether the data will be split between the two branches and if so, how many data instances will go down which branch. So at the point of the conditional instruction the number of threads required and the number of instruction fetches required may change in a way that cannot be reliably predicted before execution. By splitting a program at such points, resource scheduling can be managed dynamically in response to the data results.

Another example of an advantageous point for a new program phase is a routine for blending background colour with a transparent foreground object in a graphics program. A foreground object may have a uniform colour and so the data instances for the entire object can be processed in the same way for a colour calculation. However, the background over which the object sits may have variable colour and so different portions of the object must be processed differently in a blending routine. The blending routine may therefore be advantageously placed in a separate phase of the program to the colour routine.

A further example of an advantageous point for a new program phase is an anti-aliasing routine. Anti-aliasing is used when representing a high resolution image on a lower resolution screen. To remove undesirable artefacts, such as jagged edges, an anti-aliasing routine is used to smooth out the image. But anti-aliasing is only required at the edges of graphics objects. If a block of uniform colour is in the image, it is not necessary to process the bulk of it at high resolution and perform anti-aliasing. Only at the boundaries with other objects is it necessary. So a program might include a branch instruction so that edge portions of image data are processed using the anti-aliasing routine while larger blocks of data are processed in a much less computationally expensive way.

The programs are divided into phases by the inclusion of "phase completed" instructions at the end of each phase of the program. The phase completed instructions when executed feed back to the scheduler 100 an indication that a phase as been completed. The phase completed instructions include a program identifier.

The program instructions also include an indication of the resource requirements of the program, but instead of being provided at the start of the program to cover the entire program, they are provided at the beginning of each phase of the program. The scheduler 100 can then assess if there are sufficient resources available to execute the phase. Because the resources required may depend on the outcome of a preceding phase, the indication of the resources required may be in the form an algorithm to calculate the resources required. This dynamic calculation of resource requirements removes the need to always provision for the worst case scenario and leads to more efficient resource allocation.

The scheduler 100 includes a multi-phased execution control unit or thread finished counter 160 that stores a record of each program scheduled, and the number of threads scheduled for the current phase. At the start of a new program the scheduler creates a new record in the thread finished counter 160, and updates it every time a new phase of that program is scheduled. As each thread finishes a phase of a program the thread finished counter 160 receives an indication and adjusts the record for the number of threads executing for that phase of that program. The count of threads for a phase of that program is simply decremented each time a thread finishes the phase until the thread count reaches zero. When the thread count for the phase of that program reaches zero, a new phase of that program can be scheduled. The thread finished counter 160 may be provided as part of the scheduler or as a separate component; FIG. 1 depicts thread finished counter 160 as part of scheduler 100 and FIG. 5 depicts thread finished counter 160 as a separate component.

Figure 2:
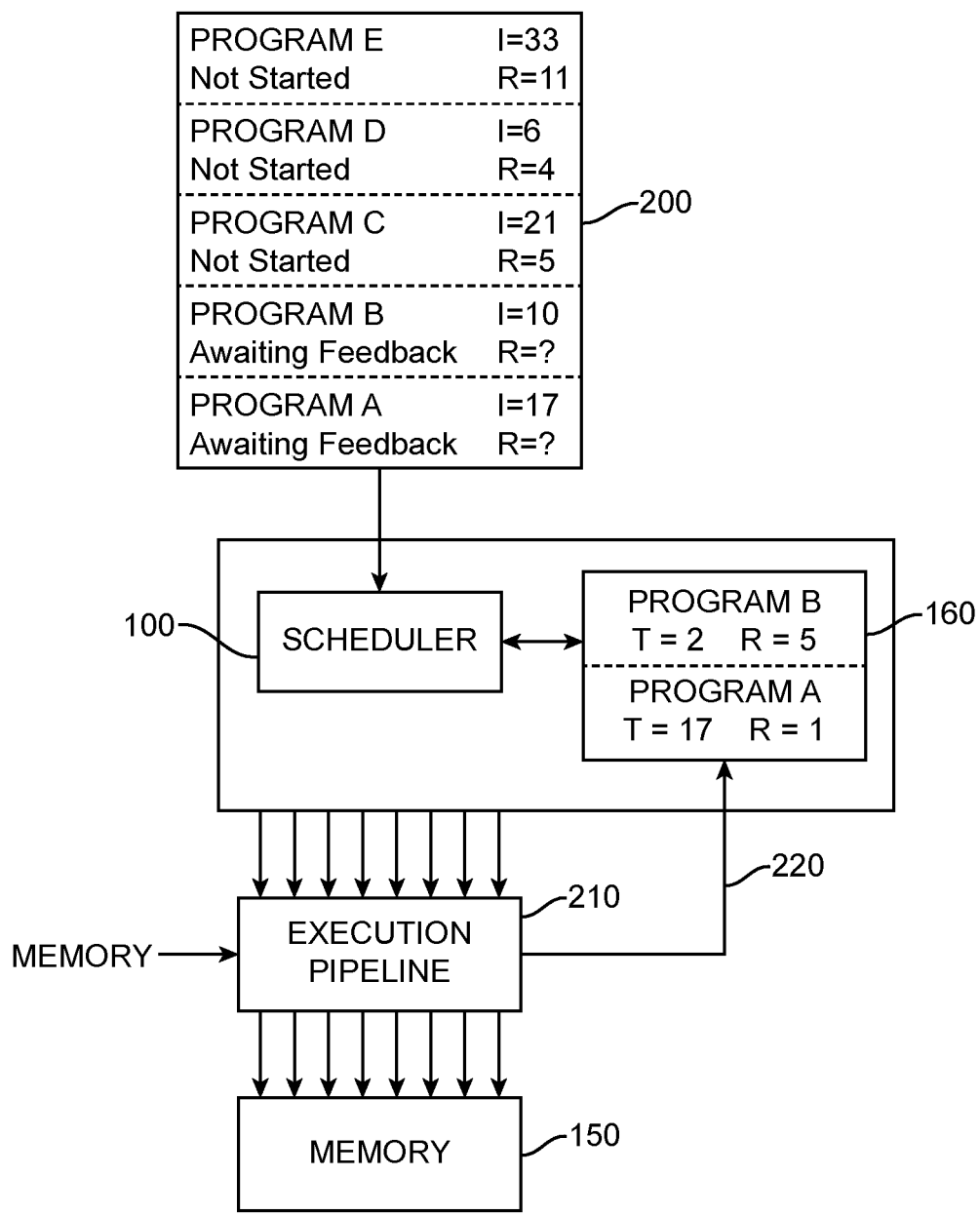
FIG. 2 is a schematic illustration of a program scheduling scheme in accordance with the present invention.

FIG. 2 is a schematic illustration of scheduling and execution process in accordance with the present invention showing the content of a program queue and a thread finished counter. A stream of programs is provided in a program queue as an input to a scheduler. The programs 200 are each divided into phases as described above, and each program has a predetermined number of data instances, indicated as the value I in the program queue. The number of instances per thread is indicated by the value R. The scheduler 100 schedules an individual phase of a program and waits for an indication that that phase is complete before scheduling the next phase of that program. In the example shown in FIG. 2 there are three programs in the program queue not yet scheduled and two programs, program A and program B currently being executed, but with further phases remaining to be scheduled. The number of instances per thread, R, is known for the initial phase of each program but may be altered for subsequent phases of the program depending on the outcome of preceding phases. So the value of R is not known for the phases of programs A and B yet to be scheduled.

The phase of program A being executed has 17 threads, indicated in the thread finished counter 160 by the value T. Each thread contains a single data instance, so R=1. The phase of program B being executed has 2 threads each with 5 instances per thread. FIG. 2 shows multiple threads scheduled by the scheduler entering the execution pipeline 210. The execution pipeline comprises the instruction fetch, issue logic and ALUs shown in FIG. 1.

As already described with reference to FIG. 1, the thread finished counter 160 stores a record for each program scheduled, and the number of threads scheduled for the current phase. As each thread finishes a phase the thread finished counter 160 receives an indication 220 from the end of the execution pipeline 210 and adjusts the record for the number of threads executing for that program. The count of threads T for a program is simply decremented each time a thread finishes until the thread count reaches zero. When the thread count for a program reaches zero, a new phase of that program can be scheduled.

Figure 3:
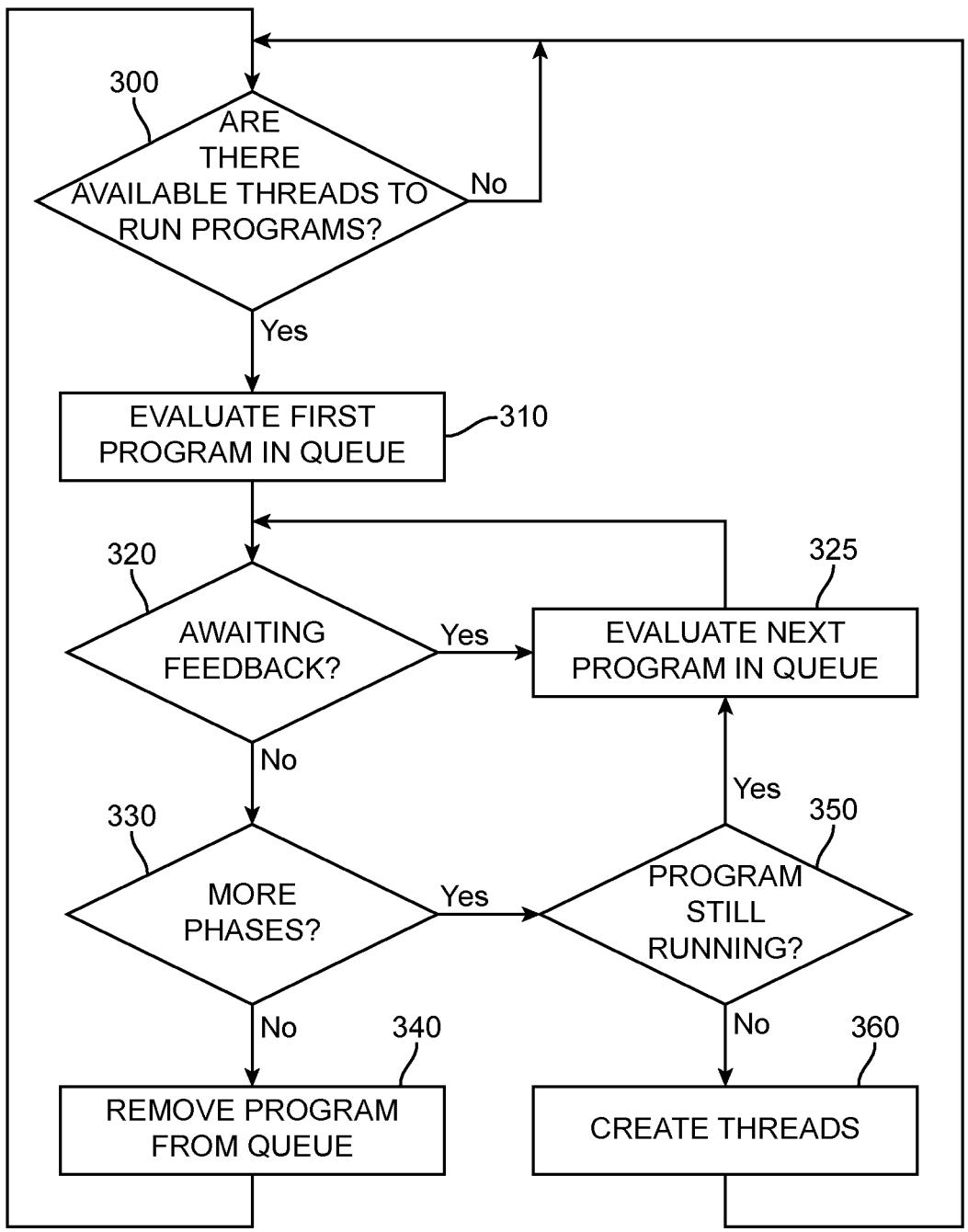
FIG. 3 is a flow diagram illustrating the steps carried out by the scheduler of FIG. 2.

FIG. 3 is a flow diagram showing the process steps carried out by the scheduler in deciding how to schedule new threads. In step 300 the scheduler first checks if there are threads available for running a program from the program queue that are available to run. If there are no threads available, the scheduler continues to check until there are threads available.

If there are threads available, the first program in the queue is evaluated in step 310. In step 320, the scheduler checks if the first program already has a phase running and the scheduler is waiting for feedback to indicate that the phase is completed. If so then in step 325, the next program in the queue is evaluated in the same manner. If the scheduler is not awaiting feedback from a phase of the first program, then in step 330 the scheduler assesses whether there are any further phases to execute. If there are no further phases the program is removed from the queue, as shown in step 340, and its record removed from thread finished counter.

If there are more phases left to run the scheduler determines whether the program is still running in step 350. If the program is still running, the scheduler moves to step 325 and next program in the queue is evaluated. If the program is not still running, the scheduler creates new threads for the next phase of the program, as indicated by step 360. Following the creation of new threads, the scheduler returns to the step 300 to check if there is room for any further threads.

Figure 4:
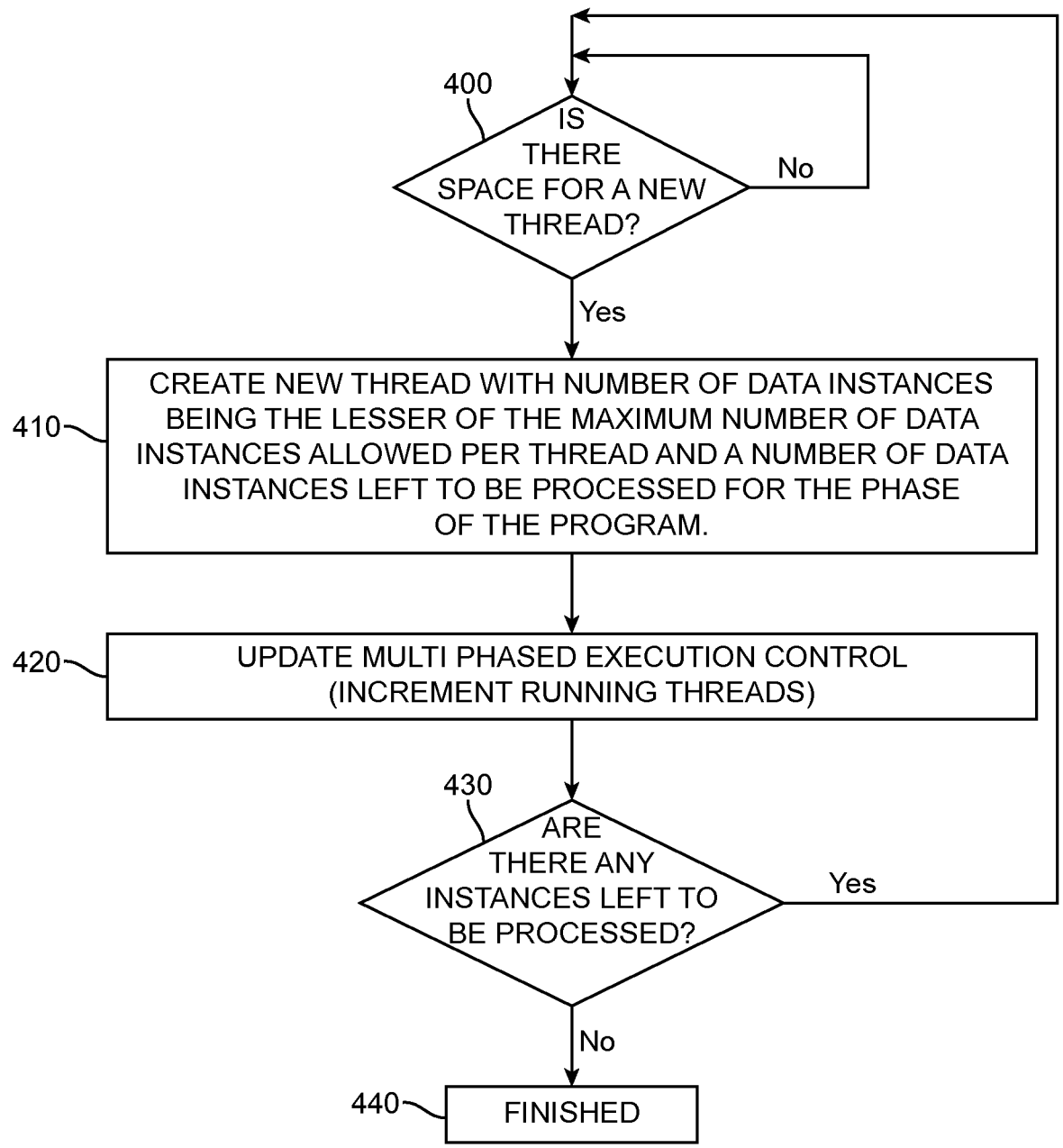
FIG. 4 is a flow diagram illustrating the process carried out by the scheduler for scheduling new threads.

FIG. 4 shows in detail the steps taken by the scheduler to create new threads in step 360. In a first step, step 400, the scheduler checks that there is space for a new thread. If not, the scheduler continues to check until space becomes available. When space for a new thread is available, the scheduler creates a new thread, shown as step 410. The number of data instances in the new thread is the lesser of the maximum number of instances allowed per thread (which is limited by the hardware) and the number of data instances left.

Once the new thread has been created, a record for the thread is created or updated in the multi phased execution control unit, and increments a count of the running threads, shown as step 420.

In step 430 the scheduler assesses whether there are further data instances to be processed in the phase. If so, the scheduler attempts to create a further thread or threads to accommodate them and increments a count of the running threads at 420. If not, the thread creation process ends in step 440 and the scheduler returns to step 300.

The present invention allows the SIMD ratio of programs to be dynamically altered during program execution. By splitting programs into multiple phases and providing a scheduler that is able to determine whether execution of a phase has been completed, each phase can be separately scheduled and the results of preceding phases can be used to inform the scheduling of subsequent phases.

What is claimed is:

1. A non-transitory machine readable medium having stored thereon a program executable on a single instruction multiple data (SIMD) processor, the program being divided into a plurality of phases by phase instructions,
   the phase instructions being provided at points in the program where processing of different data instances in SIMD parallel fashion during one phase of the plurality of phases may branch to different instructions during a subsequent phase of the plurality of phases, and
   in each phase of the plurality of phases, the program contains data to be used, by a scheduler, to dynamically calculate resource requirements for executing that phase of the program, prior to executing that phase, wherein the scheduler is configured to schedule each subsequent phase of the program separately by emitting threads and assigning data instances to said threads according to the dynamically calculated resource requirements of that subsequent phase, results of executing a preceding phase of the program, and a total number of data instances to be processed by that subsequent phase of the program.

2. The non-transitory machine readable medium according to claim 1, wherein the scheduler is configured to determine a number of data instances for each of the threads for each subsequent phase of program instructions, for a particular program of a plurality of programs, based on the results of executing a respective preceding phase of that particular program.

3. The non-transitory machine readable medium according to claim 1, wherein the scheduler is configured to maintain a record for each phase of program instructions that is scheduled, during execution of that phase of program instructions, the record maintained to track a number of threads remaining to be completed for that phase of program instructions.

4. The non-transitory machine readable medium according to claim 1, further comprising a queue comprising program description data describing programs waiting to begin execution, the queue being coupled to provide input to the scheduler, wherein the program description data comprises, for a particular program, program phase data and a number defining how many data instances are to be processed by a first phase of the particular program.

5. The non-transitory machine readable medium according to claim 4, wherein each program in the queue is further associated with an initial number of data instances per thread, and wherein the number of data instances per thread may vary between different phases of program execution.

6. A method for scheduling instructions of a program on a single instruction multiple data (SIMD) processor, the program being divided into a plurality of phases by phase instructions, the method comprising:
providing phase instructions at points in the program where processing of different data instances in SIMD parallel fashion during one phase of the plurality of phases may branch to different instructions during a subsequent phase of the plurality of phases;
dynamically calculating resource requirements in each phase of the plurality of phases prior to executing that phase; and
separately scheduling each subsequent phase of the program by emitting threads and assigning data instances to said threads according to the dynamically calculated resource requirements of that subsequent phase, results of executing a preceding phase of the program, and a total number of data instances to be processed by that subsequent phase of the program.

7. The method according to claim 6, further comprising determining a number of data instances for each of the threads for each subsequent phase of program instructions, for a particular program of a plurality of programs, based on the results of executing a respective preceding phase of that particular program.

8. The method according to claim 6, further comprising maintaining a record for each phase of program instructions that is scheduled, during execution of that phase of program instructions, the record maintained to track a number of threads remaining to be completed for that phase of program instructions.

9. The method according to claim 6, further comprising providing input from a queue comprising program description data describing programs waiting to begin execution, wherein the program description data comprises, for a particular program, program phase data and a number defining how many data instances are to be processed by a first phase of the particular program.

10. The method according to claim 9, wherein each program in the queue is further associated with an initial number of data instances per thread, and wherein the number of data instances per thread may vary between different phases of program execution.

11. A scheduler for scheduling instructions of a program on a multithreaded single instruction multiple data (SIMD) processor, the program being divided into a plurality of phases by phase instructions, the scheduler being configured to:
receive phase instructions at points in a program where processing of different data instances in SIMD parallel fashion during one phase of the plurality of phases may branch to different instructions during a subsequent phase of the plurality of phases;
dynamically calculate resource requirements in each phase of the plurality of phases prior to executing that phase; and
separately schedule each subsequent phase of the program by emitting threads and assigning data instances to said threads according to the dynamically calculated resource requirements of that subsequent phase, results of executing a preceding phase of the program, and a total number of data instances to be processed by that subsequent phase of the program.

12. The scheduler according to claim 11, wherein the scheduler is configured to determine a number of data instances for each of the threads for each subsequent phase of program instructions, for a particular program of a plurality of programs, based on the results of executing a respective preceding phase of that particular program.

13. The scheduler according to claim 11, wherein the scheduler is configured to maintain a record for each phase of program instructions that is scheduled, during execution of that phase of program instructions, the record maintained to track a number of threads remaining to be completed for that phase of program instructions.

14. The scheduler according to claim 11, wherein the scheduler is coupled to receive input from a queue, the queue comprising program description data describing programs waiting to begin execution, wherein the program description data comprises, for a particular program, program phase data and a number defining how many data instances are to be processed by a first phase of the particular program.

15. The scheduler according to claim 14, wherein each program in the queue is further associated with an initial number of data instances per thread, and wherein the number of data instances per thread may vary between different phases of program execution.

* * * * *

UNITED STATES PATENT AND TRADEMARK OFFICE
CERTIFICATE OF CORRECTION

PATENT NO. : 10,585,700 B2
APPLICATION NO. : 15/056866
DATED : March 10, 2020
INVENTOR(S) : Yoong Chert Foo Page 1 of 1

It is certified that error appears in the above-identified patent and that said Letters Patent is hereby corrected as shown below:

In the Specification

Column 1, Line 50 replace "instruction" with -- "instructions --.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*